April 9, 1940.  J. KEPLINGER  2,196,799
AUTOMATIC BRAKE ADJUSTER
Filed June 7, 1938

Inventor
John Keplinger,
By Clarence A. O'Brien
and Hyman Berman
Attorneys

Patented Apr. 9, 1940

2,196,799

UNITED STATES PATENT OFFICE 2,196,799

AUTOMATIC BRAKE ADJUSTER

John Keplinger, Cambridge, Md.

Application June 7, 1938, Serial No. 212,354

7 Claims. (Cl. 188—79.5)

The present invention relates to automatic brake adjusters for hydraulic brake systems of vehicles, and has for its primary object to provide a spring actuated screw take-up for the piston of the brake cylinder, whereby to normally urge the piston in an outwardly projected position for maintaining the brake shoe into close engagement with the brake drum of the wheel.

A further object is to provide an attachment for hydraulic brakes of this character which is of simple and practical construction, efficient and reliable in performance, relatively inexpensive to manufacture and install in operative position and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout, and in which—

Figure 1:
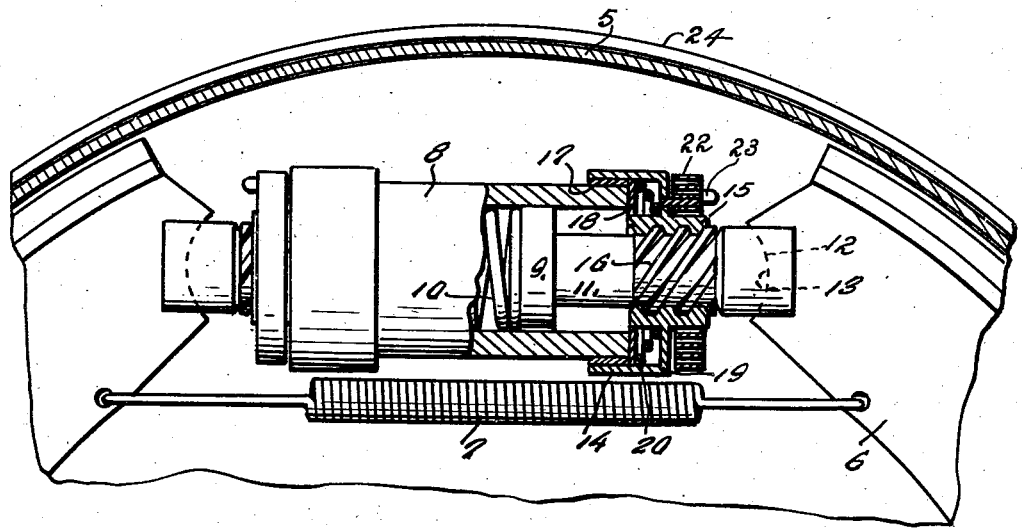
Figure 1 is a side elevational view of a hydraulic brake cylinder for the brake shoes of a vehicle wheel and with parts broken away and shown in section.
Figure 2:
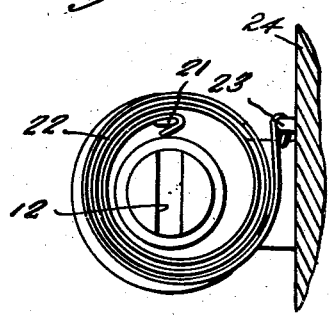
Figure 2 is an end elevational view of the outer end of the piston and showing the spring connected to the piston for rotating the same into a projected position.
Figure 3:
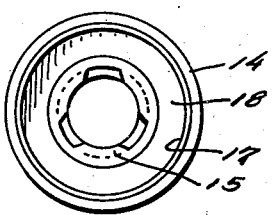
Figure 3 is an end elevational view of the cap for the end of the cylinder.
Figure 4:
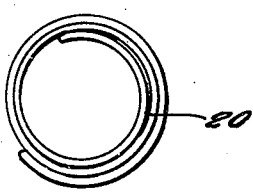
Figure 4 is a detail of one of the coil springs providing a yieldable connection between the end of the cylinder and the cap.

Referring now to the drawing in detail, wherein for the purpose of illustration I have disclosed a preferred embodiment of invention, the numeral 5 designates the brake drum of a vehicle having a pair of brake shoes 6 mounted therein in braking engagement therewith, said shoes being connected to each other adjacent one end by an expansible coil spring 7 to retract the shoes in a manner well known in the art.

Arranged in the drum is a hydraulic brake cylinder 8, open at each end and provided with a pair of oppositely operable pistons 9 maintained in spaced relation within the cylinder by a coiled spring 10. Each piston is provided with a stem 11 which projects outwardly of the end of the cylinder, the outer end of the stem being bifurcated as shown at 12 for seating in a notch 13 formed in one edge of an adjacent brake shoe 6.

Each end of the cylinder is provided with a cap 14 having an internally threaded hub portion or collar 15 for threaded engagement with the spiral threads 16 formed on the stem 11, said caps being free to rotate about the cylinder. Interposed between the inside of the cap 14 and the outside of the cylinder 8 is a ring member 17, held in cap 14 by a pressure fit to control the amount of space between the end of the cap 19 and the edge of the ring 17. This space is maintained to allow for clearance of brake shoe and drum when the brake is released. Confined to the space between the ring 17 and the cap 14 is a pressure plate or washer 18 overlying the end of the cylinder, and the end of the cap 14 is being maintained in spaced relation with respect to said pressure plate 18 by means of a spiral spring 20.

Projecting from the outer surface of the end portion 19 of the cap is a pin 21 to which one end of a coiled spring 22 is attached, the opposite ends of said spring being secured to a lug 23 formed on the inner surface of the brake shoe supporting flange 24.

Each end of the cylinder 8 is constructed in a similar manner to that described above.

In the operation of the device, the stem 11 will be constantly urged in an outwardly projected position independent of the pressure of the fluid contained in the cylinder, by means of the coiled spring 22 operating upon the hub portion 15 of the cap 14, to rotate the same, the rotary movement of the hub 15 being transferred to rectilinear movement of the stem 11 by reason of the threaded engagement between the stem and the hub. In this manner the brake shoes will be maintained in a constantly and automatically adjusted position, the springs 7 being of sufficient strength to keep the brake shoes out of actual contact with the brake drum upon a release of the brake, the spring 20 interposed between the outer end 19 of the cap and the end of the cylinder permitting sufficient retracting movement of the brake shoes for this purpose. When the stem 11 is projected outwardly by the brake applying pressure created in the cylinder, the spring 22 serves to rotate the collar 15, thus threading the collar and cap 14 inwardly toward the cylinder to restrict retracting movement of the stem. The spring 20 interposed between the washer 18 and the end 19 of the cap limits inward movement of the cap and collar and maintains a working space between the end of the cylinder and the end 19 of the cap to permit proper releasing movement of the brakes by the springs 7.

It is believed the details of construction and manner of operation of the device will be readily understood from the foregoing without further detailed explanation.

Having thus described the invention, what I claim is—

1. An automatic brake adjuster for hydraulic brakes comprising a brake cylinder having a piston operable therein, a stem carried by the piston projecting outwardly from the cylinder for brake applying engagement with a brake shoe, screw threaded means having operative engagement with said stem, spring means for rotatably operating said screw threaded means for moving the latter inwardly toward the cylinder to restrict retracting movement of the stem and spring means maintaining a working space between the screw threaded means and the cylinder.

2. An automatic adjuster for hydraulic brakes comprising a brake cylinder having a piston operable therein, a stem carried by the piston projecting outwardly from the cylinder and having brake operating engagement with a brake shoe, screw threads carried by said stem, a collar having screw threaded engagement with the threads of the stem, spring means for rotatably actuating said collar for moving the latter inwardly toward the cylinder to restrict retracting movement of the stem and spring means maintaining a working space between the screw threaded means and the cylinder.

3. An automatic adjuster for hydraulic brakes comprising a hydraulic brake cylinder having a piston operable therein, a stem carried by the piston and projecting outwardly of the cylinder, said stem having brake operative engagement with a brake shoe, screw threads formed on said stem, a cap mounted on the end of the cylinder, an internally threaded hub carried by the cap and having threaded engagement with the threads of the stem, spring means between the end of the cylinder and the cap yieldably spacing the cap from the cylinder and a coiled spring fixedly connected at one end and having its opposite end connected to said cap for rotatably actuating the same whereby to limit retracting movement of the stem.

4. An automatic brake adjuster for hydraulic brakes comprising a brake cylinder having a piston operable therein, a stem carried by the piston projecting outwardly from the cylinder for brake applying engagement with a brake shoe, screw-threaded means having operative engagement with said stem and movable relative to an adjacent end of the cylinder, spring means for threading the screw-threaded means inwardly upon outward movement of the stem to restrict brake releasing movement of the stem and spring means between the said end of the cylinder and the screw-threaded means to yieldably maintain a working space therebetween.

5. An automatic brake adjuster for hydraulic brakes comprising a brake cylinder having a piston operable therein, a stem carried by the piston projecting outwardly from the cylinder for brake applying engagement with a brake shoe, screw-threaded means having operative engagement with said stem and movable relative to an adjacent end of the cylinder, spring means threading the screw-threaded means inwardly upon each outward movement of the stem and spring means in abutting relation with said screw-threaded means to limit said threading movement.

6. An automatic brake adjuster for hydraulic brakes comprising a brake cylinder having a piston operable therein, a stem carried by the piston projecting outwardly from the cylinder for brake applying engagement with a brake shoe, screw-threaded means having operative engagement with said stem and movable relative to an adjacent end of the cylinder, spring means exerting a rotary pull on said screw-threaded means to thread the latter inwardly on the stem upon each outward movement of the stem and spring means limiting said threading movement.

7. An automatic brake adjuster for hydraulic brakes comprising a brake cylinder having a piston operable therein, a stem carried by the piston projecting outwardly from the cylinder for brake applying engagement with a brake shoe, screw-threaded means having operative engagement with said stem and movable relative to an adjacent end of the cylinder, spring means exerting a rotary pull on said screw-threaded means to thread the latter inwardly on the stem upon each outward movement of the stem and spring means limiting said threading movement, said last named spring means further constituting a yieldable stop for the retracting movement of the stem.

JOHN KEPLINGER.